(12) United States Patent
Kumar et al.

(10) Patent No.: US 10,649,550 B2
(45) Date of Patent: May 12, 2020

(54) PREDICTIVE DETECTION OF USER INTENT FOR STYLUS USE

(71) Applicant: Intel Corporation, Santa Clara, CA (US)

(72) Inventors: Arvind Kumar, Beaverton, OR (US); Amy Wiles, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 16/018,711

(22) Filed: Jun. 26, 2018

(65) Prior Publication Data

US 2019/0042009 A1 Feb. 7, 2019

(51) Int. Cl.
*G06F 3/03* (2006.01)
*G06F 3/0354* (2013.01)
*G06F 3/0346* (2013.01)
*G06F 3/038* (2013.01)

(52) U.S. Cl.
CPC .......... *G06F 3/03545* (2013.01); *G06F 3/038* (2013.01); *G06F 3/0346* (2013.01); *G06F 2203/0384* (2013.01)

(58) Field of Classification Search
CPC .......... G06F 2203/0384; G06F 3/0346; G06F 3/03545; G06F 3/038

USPC .................................................. 345/156, 690
See application file for complete search history.

(56) References Cited

U.S. PATENT DOCUMENTS

| | | | | |
|---|---|---|---|---|
| 2014/0253521 | A1* | 9/2014 | Hicks | G06F 3/03545 345/179 |
| 2015/0220169 | A1* | 8/2015 | Keating | G06F 3/03545 345/179 |
| 2017/0068339 | A1* | 3/2017 | Zimmerman | G06F 3/04162 |
| 2018/0246587 | A1* | 8/2018 | Dekel | G06F 3/0383 |
| 2018/0335811 | A1* | 11/2018 | Mori | G06F 1/1694 |
| 2019/0042009 | A1* | 2/2019 | Kumar | G06F 3/03545 |

* cited by examiner

*Primary Examiner* — Tony O Davis
(74) *Attorney, Agent, or Firm* — Grossman, Tucker, Perreault & Pfleger, PLLC

(57) ABSTRACT

One embodiment provides a method. The method includes receiving, with a computing system, stylus orientation data representing an orientation of a stylus. The method includes receiving, with a computing system, grip characteristics data representing a grip on the stylus by a user. The method includes identifying, with the computing system, a stylus mode for use by the computing system, at least partially based on the stylus orientation data and the grip characteristics data. The method includes applying the stylus mode to the computing system to interpret interaction data representing interactions of the stylus with the computing system.

22 Claims, 10 Drawing Sheets

PREDICTIVE DETECTION OF USER INTENT FOR STYLUS USE

FIELD

The present disclosure relates to detecting user intent for stylus use with a computing system.

BACKGROUND

A stylus has become a popular tool for interacting with tablets, laptops, phablets, and other types of computing systems. With a stylus, a user can select, click, type, draw, and perform other interactive functions that may be more difficult and/or less precise than a user's finger. Despite the advantages and multiple uses of a stylus, actually getting to the desired mode of use can be tricky and/or inconvenient. For example, if the stylus is being used as a paintbrush in a painting application, it can be inconvenient for a user to change the mode of use to a selection mode or other mode to perform other functions with the stylus. Thus, computer interactions with a stylus have room for improvement.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Disclosed herein are methods and systems for determining a user's intent for use of a stylus, according to various embodiments. The method and system use stylus grip characteristics, stylus orientation, and/or computing system orientation to determine which stylus mode to automatically select for a user for interpreting stylus interactions with a computing system. The identification and selection of a particular stylus mode (from a number of stylus modes) improves the smoothness of and personalizes a user's experience with a stylus and computing system.

The disclosed methods and systems include receiving, with a computing system, stylus orientation data representing an orientation of a stylus. The methods and systems include receiving, with a computing system, grip characteristics data representing a grip on the stylus by a user. The methods and systems include identifying, with the computing system, a stylus mode for use by the computing system, at least partially based on the stylus orientation data and the grip characteristics data. The methods and systems include applying the stylus mode to the computing system to interpret interaction data representing interactions of the stylus with the computing system.

As used herein, the term stylus refers to a device for interacting with a computing system, and may include a writing implement or tool used for communicating with a stylus-enabled computing system or component of a computing system.

Figure 1:
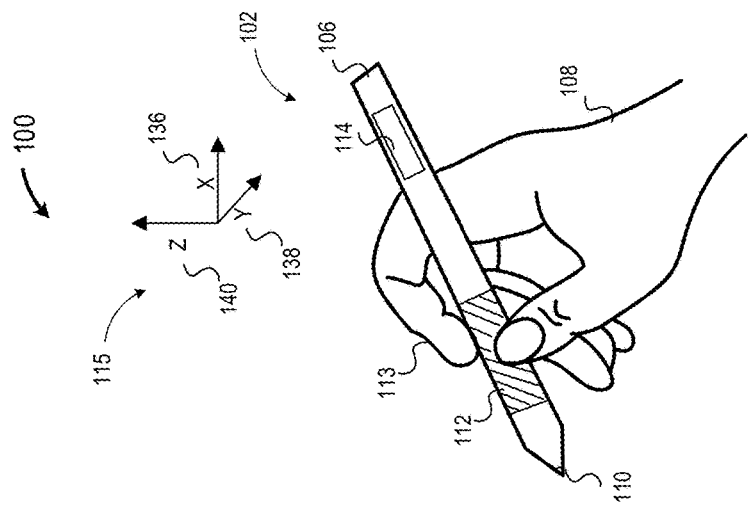
FIG. 1 illustrates a functional block diagram of a system, consistent with embodiments of the present disclosure.
Figure 1:
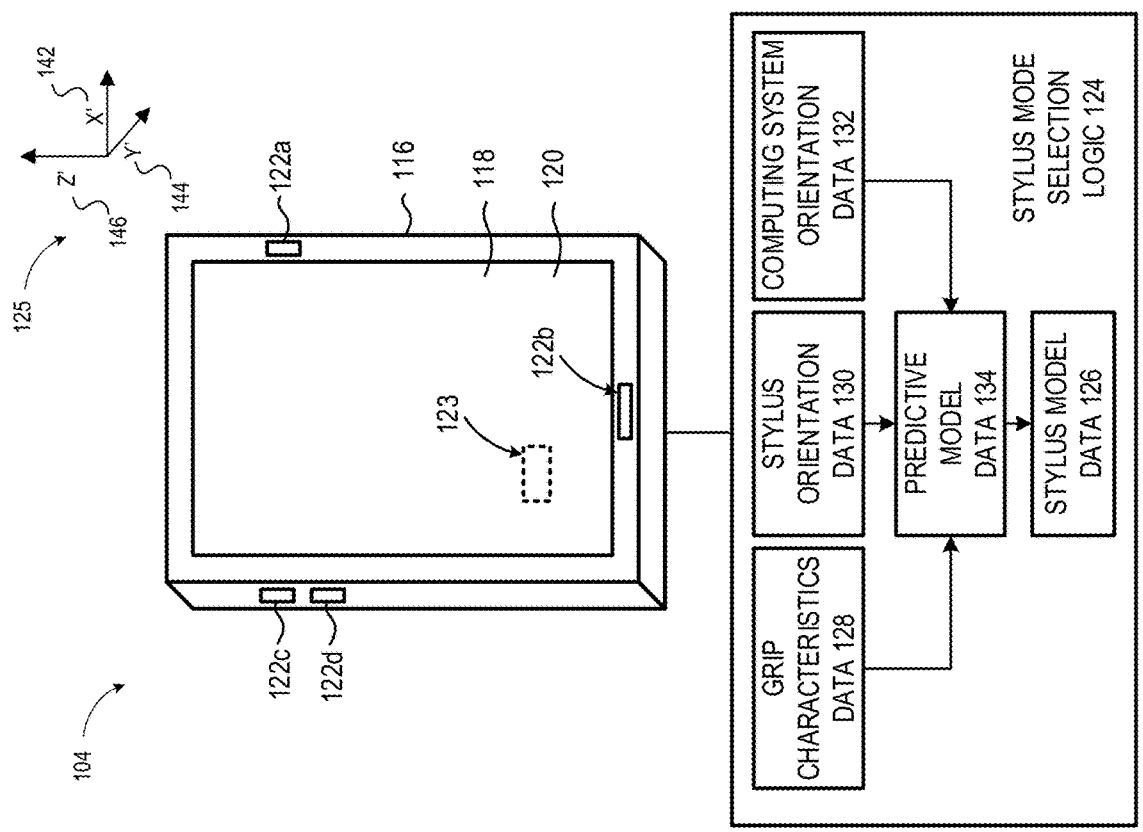

FIG. 1 illustrates a block diagram of a system 100 that is configured to determine a stylus mode of operation at least partially based on stylus characteristics and/or computing device orientation, consistent with several embodiments of the present disclosure. The system 100 includes a stylus 102 for use with interacting with a computing system 104. The system 100 is configured to determine various stylus characteristics and predict one or more stylus modes that reflect a user's intent for the stylus, according to an embodiment. The system 100 is configured to use a stylus orientation, grip characteristics of a user's grip on the stylus 102, and/or a computing system orientation to determine a user's intent for the stylus and to select an appropriate stylus mode for the user, according to an embodiment.

The stylus 102 can be used to interact with the computing system 104 in a variety of ways. For example, the stylus 102 can be used to write, paint, draw, select, drag and drop, double-tap, left-click, right-click, middle-click, double-click, point, hover, or otherwise interact with the computing system 104. The stylus 102 can include a housing 106 (held by a user's hand 108), a tip 110, a grip sensor 112, and an orientation sensor 114, according to an embodiment.

The housing 106 may be implemented in a variety of forms. The housing 106 may be substantially cylindrical, may be shaped like a pencil, may be rectangular, may be triangular, may be shaped in the form of a caricature (e.g., a dolphin), or may include one or more other shapes that facilitate being held or carried by the user. The housing 106 may be metal, polymer, glass, and/or a combination of various materials.

The tip 110 may be used to make contact with the computing system 104, to facilitate interactions with the computing system 104. The tip 110 may be plastic, rubber, a ballpoint, felt-tipped, interchangeable between multiple materials, and the like.

The grip sensor 112 may be used to acquire grip characteristics data that is representative of grip characteristics of the user's hand 108 and, more specifically, of a user's fingers 113, according to an embodiment. The grip sensor 112 can be a pressure sensor, a capacitive sensor, a thermal sensor, an image sensor, and/or any combination thereof, according to an embodiment. The grip sensor 112 acquires or generates grip characteristics data that represents grip characteristics. The grip characteristics may include near-grip characteristics such as hovering and not hovering. The grip characteristics may include quantitative characteristics, qualitative characteristics, and pattern characteristics. Examples of various quantitative characteristics, qualitative characteristics, and pattern characteristics are illustrated in FIGS. 3A-3D. Quantitative characteristics include how much of the grip sensor 112 is contacted by the user's fingers 113. In one embodiment, the grip sensor 112 is partitioned/organized into various units (e.g., squares, pixels, etc.), and quantitative characteristics describe how many of the units are activated/touched with a user's grip. Qualitative characteristics include an amount of pressure or force applied by the user's fingers 113 to the grip sensor 112, according to an embodiment. Examples of qualitative characteristics may include no touch, not hovering, hovering, light touch, medium touch, firm touch, and the like. Other examples of qualitative characteristics may include one or more of a variety of scales (e.g., a scale of 1 to 10) to map grip pressure to a numeric scale. Pattern characteristics include patterns that are indicative of a type of grip being applied to the grip sensor 112 by the user's hand 108 and/or by the user's fingers 113, according to an embodiment. Each pattern (of a number of patterns) may correspond with a particular grip or type of use, according to an embodiment. For example, one pattern and its close variants may correspond with gripping the stylus 102 as a person would grip a pencil. As another example, one pattern and its close variants may correspond with gripping the stylus 102 as a person would grip a paintbrush. One pattern and its close variants may correspond with gripping the stylus 102 as a person would grip a pointing device, and one pattern and its close variants may correspond with gripping the stylus 102 as a person would grip a selection device.

The orientation sensor 114 generates stylus orientation data that is representative of a stylus orientation 115, according to one embodiment. The stylus orientation 115 may be represented by one or more coordinate systems, such as the Cartesian coordinate system, according to an embodiment. The stylus orientation 115 may include an orientation around an x axis 136, a y axis 138, and a z axis 140, according to one embodiment. The x axis 136 may correspond with a roll angle, the y axis 138 may correspond with a pitch angle, and the z axis 140 may correspond with a yaw angle for the stylus 102, according to an embodiment. The stylus orientation data and the grip data may be transmitted to the computing system 104 to enable the computing system 104 to determine a user's intent of use of the stylus 102 and to enable the computing system 104 to select a stylus mode of operation for the user based on grip and orientation characteristics of the stylus 102.

The computing system 104 receives the stylus orientation data and/or the grip data and sets a stylus mode of operation for the user at least partially based on the grip data and/or orientation data of the stylus 102, according to an embodiment. The computing system 104 can be configured to handle or interpret interactions by the stylus 102, using an operating system, one or more applications, one or more firmware drivers, and/or one or more stylus interpreting programs, according to various embodiments. The computing system 104 applies a particular stylus mode to use to interpret the stylus interactions received by the computing system 104. As a result, taps, swipes, strokes, hover motions, and other stylus interactions that are proximate or in contact with the computing system 104 may be interpreted and applied to an operating system, application, or program in a manner that is intended by the user, according to an embodiment.

The computing system 104 includes a housing 116, a stylus sensor 118, a display 120, a number of buttons 122 (inclusive of buttons 122a, 122b, 122c, and 122d), an orientation sensor 123, and stylus mode selection logic 124, according to an embodiment. The housing 116 may include a housing for a laptop computer, tablet, phablet, smart phone, personal digital assistant ("PDA"), desktop computer, or other electronic computing system. The stylus sensor 118 generates interaction data that represents interactions of the stylus 102 with the computing system 104. The interaction data may include, but is not limited to, data representing location of contact between the stylus 102 and the computing system 104, data representing pressure of contact between the stylus 102 and the computing system 104, data representing a location of proximal contact (near but not actual contact) of the stylus 102 and the computing system 104, and/or data representing motions of proximal contact of the stylus 102 and the computing system 104, according to an embodiment. The display 120 may be a monitor, a touch screen, a screen, or some other visualization component. The stylus sensor 118 may use the functionality of the display 120. The stylus sensor may be integrated into, around, or proximate to the display 120 in the computing system 104.

The orientation sensor 114 generates computing system orientation data that is representative of a computing system orientation 125, according to one embodiment. The computing system orientation 125 may be represented by one or more coordinate systems, such as the Cartesian coordinate system, according to an embodiment. The computing system orientation 125 may include an orientation around an x axis 142, a y axis 144, and a z axis 146, according to one embodiment. The x axis 142 may correspond with a roll angle, the y axis 144 may correspond with a pitch angle, and the z axis 146 may correspond with a yaw angle for the computing system 104, according to an embodiment.

The computing system 104 may use the stylus orientation 115 and the computing system orientation 125 to identify a stylus angle or orientation that is relative to the computing system 104, according to an embodiment. The computing system 104 may identify a relative stylus angle by subtracting or otherwise calculating the difference between the roll angles, pitch angles, and yaw angles for the stylus 102 and the computing system 104.

The stylus mode selection logic 124 represents instructions executed by the computing system 104 to perform one or more methods or processes for identifying, determining, implementing, and/or executing a stylus mode that is represented by stylus mode data 126. The stylus mode selection logic 124 applies one or more of grip characteristics data 128, stylus orientation data 130, and/or computing system orientation data 132 to a predictive model represented by predictive model data 134. The output of the predictive model is a stylus mode represented by the stylus mode data 126, which may be referred to as a category.

The stylus mode data 126 represents a stylus mode that may be selected from a group of stylus modes, by the computing system 104, according to an embodiment. The group of stylus modes may include, but is not limited to, a writing mode (e.g., a pen or pencil), a painting mode (e.g., water color or oil), a drawing mode (e.g., crayon, pencil, chalk, coal, etc.), a spray paint mode, a selection mode, or a pointer mode, according to an embodiment. In each of the various stylus modes, the computing system 104 may be configured to interpret contact, motion, proximate contact, and/or motion during proximate contact to represent different user intentions. For example, a single tap of the display by the stylus 102 in selection tool mode may represent a user's intent to perform a single click of a mouse. By contrast, a single tap of the display by the stylus 102 in draw mode or in paint mode may represent a user's intent to draw a small circle. The stylus mode data 126 may be selected based on grip characteristics data 128 and stylus orientation data 130, according to an embodiment. The grip characteristics data 128 and the stylus orientation data 130 may originate from a single sensor or from two or more sensors on the stylus 102, according to an embodiment. In some implementations (e.g., capacitive touch), touch and stylus use the same set of sensors. By predictably identifying and executing a particular stylus mode (from a group of stylus modes), the computing system 104 may improve a user's experience in performing various functions with the computing system 104, according to an embodiment.

The predictive model data 134 is representative of a predictive model that identifies or determines a stylus mode based on at least one of grip characteristics data 128, stylus orientation data 130, and computing system orientation data 132, according to one embodiment. The predictive model is represented by the predictive model data 134, and the predictive model data 134 may be generated using one or more of a variety of machine learning techniques. For example, the predictive model data 134 may be generated by applying previously acquired grip characteristics data, applying previously acquired stylus orientation data, and/or applying previously acquired computing system orientation data to one or more machine learning algorithms to train the predictive model that is represented by the predictive model data 134, according to an embodiment. Examples of machine learning algorithms include, but are not limited to, decision tree learning, artificial neural networks, clustering, Bayesian networks, classifier algorithms, and the like, according to various embodiments. The previously acquired or existing data sets are applied to the one or more machine learning algorithms, and the one or more machine learning algorithms generate the predictive model data 134 that is representative of a predictive model. When new data (e.g., grip characteristics data 128, stylus orientation data 130, and/or computing system orientation data 132) is applied to the predictive model data 134, the predictive model data 134 generates a category that is selected from a group of predefined categories, according to an embodiment. The category is representative of a stylus mode, and the group of predefined categories is representative of a group of predefined stylus modes. The output of the predictive model data 134 may be a number that is on a scale, for example, from 0 to 10 that represents a likelihood that the input data correlates with a particular stylus mode, according to an embodiment. The output of the predictive model data 134 may include multiple numbers, wherein each of the multiple numbers are representative of a scale, for example, from 0 to 10 that represents a likelihood that the input data correlates with particular stylus modes, according to an embodiment.

Figure 2:
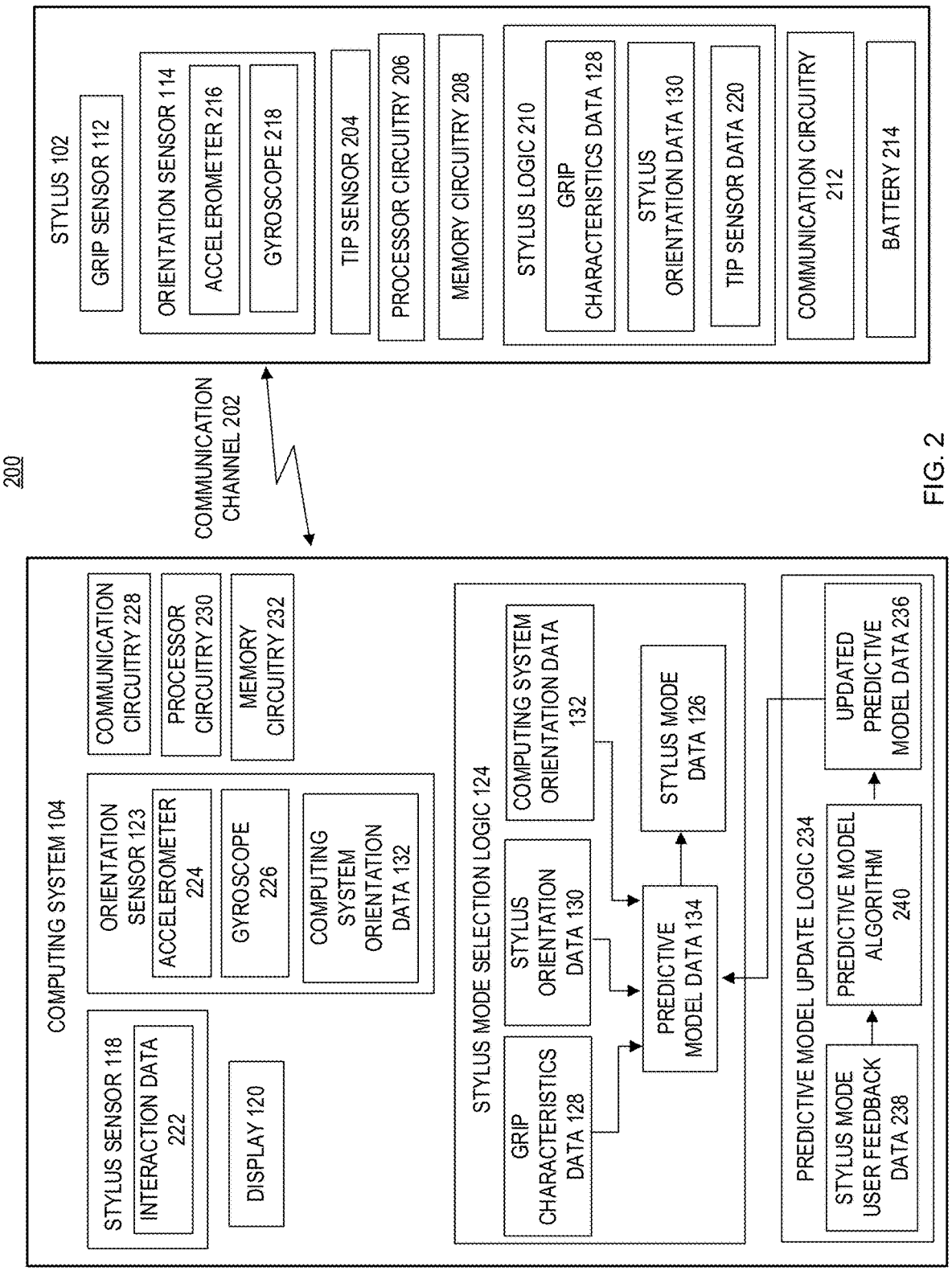
FIG. 2 is a block diagram of a system, consistent with embodiments of the present disclosure.

FIG. 2 illustrates a diagram a system 200 that is configured to determine a stylus mode of operation at least partially based on stylus characteristics, consistent with several embodiments of the present disclosure. The system 200 is an implementation of the system 100, consistent with several embodiments of the present disclosure. The system 200 includes the stylus 102 that is configured to interact with the computing system 104. The stylus 102 is configured to communicate information to the computing system 104 over a communications channel 202, according to an embodiment. The communication channel 202 may include, but is not limited to, a Bluetooth wireless communications channel, a Wi-Fi communication channel, a universal stylus initiative (USI) communication channel, and the like.

The stylus 102 includes the grip sensor 112, the orientation sensor 114, a tip sensor 204, processor circuitry 206, memory circuitry 208, stylus logic 210, communication circuitry 212, and a battery (or other power supply) 214, according to an embodiment. The orientation sensor 114 may include an accelerometer 216 and/or a gyroscope 218 to identify and acquire the stylus orientation data 130, according to an embodiment. The tip sensor 204 may include one or more pressure sensors and/or capacitive sensors configured to detect an amount of pressure applied to the tip of the stylus 102, according to an embodiment. The processor circuitry 206 is configured to execute instructions stored by the memory circuitry 208, which may include, but are not limited to, the stylus logic 210, according to an embodiment. The stylus logic 210 includes one or more instructions that enable the processor circuitry 206 to acquire the grip characteristics data 128 from the grip sensor 112, according to an embodiment. The stylus logic 210 includes one or more instructions that enable the processor circuitry 206 to acquire the stylus orientation data 130 from the orientation sensor 114, according to an embodiment. The stylus logic 210 includes one or more instructions that enable the processor circuitry 206 to acquire tip sensor data 220 from the tip sensor 204, according to an embodiment.

The communication circuitry 212 and the battery 214 enable the stylus 102 to operate untethered from the computing system 104, according to an embodiment. The communication circuitry 212 enables the stylus 102 to communicate information to the computing system 104 over the communication channel 202, according to an embodiment. The communication circuitry 212 enables the processor circuitry 206 to transmit at least one of the grip characteristics data 128, the stylus orientation data 130, and the tip sensor data 220 to the computing system 104, to enable the computing system 104 to select a stylus mode from a group of stylus modes, according to an embodiment.

The computing system 104 includes the stylus sensor 118, the display 120, the orientation sensor 123, and the stylus mode selection logic 124, according to an embodiment. The computing system 104 generates interaction data 222 from the stylus sensor 118, in response to interactions of the stylus 102 with the computing system 104, according to one embodiment. The orientation sensor 123 may include at least one of an accelerometer 224 and a gyroscope 226, which may be used by the computing system 104 to generate computing system orientation data 132, according to an embodiment. As discussed above, the stylus mode selection logic 124 applies at least one of the grip characteristics data 128, the stylus orientation data 130, and the computing system orientation data 132 to the predictive model data 134, to generate stylus mode data 126 (that is representative of a stylus mode), according to an embodiment.

The computing system 104 includes communication circuitry 228, processor circuitry 230, and memory circuitry 232, according to an embodiment. The computing system 104 uses the communication circuitry 228 to receive at least one of grip characteristics data 128, stylus orientation data 130, and tip sensor data 220 from the stylus 102, according to an embodiment. The processor circuitry 230 is configured to execute instructions stored by the memory circuitry 232, in order to execute the stylus mode selection logic 124 and/or the predictive model update logic 234, according to an embodiment.

The processor circuitry 230 or the computing system 104 executes the predictive model update logic 234 to generate updated predictive model data 236 that is representative of an updated predictive model, according to an embodiment. The updated predictive model data 236 may be used to replace, update, or upgrade the predictive model data 134, at least partially based on user feedback, according to an embodiment. The predictive model update logic 234 receives stylus mode user feedback data 238, and the applies the stylus mode user feedback data 238 to predictive model algorithm data 240 (that is representative of a predictive model algorithm), to generate the updated predictive model data 236, according to an embodiment.

The stylus mode user feedback data 238 is representative of stylus mode user feedback. The stylus mode user feedback may be provided by a user when the stylus mode data 126 is not representative of a user's intent for the stylus 102, according to an embodiment. As an example, the stylus mode user feedback may be represented by a user selecting a paintbrush stylus mode after the computing system 104 predicted that the user intended to use a drawing stylus mode. The predictive model update logic 234 may generate an updated predictive model that personalizes (through predictive model evolution) the selection of stylus modes from stylus characteristics and/or computing system orientation data.

FIGS. 3A, 3B, 3C, and 3D are example diagrams of a signature maps that are representative of quantitative, qualitative, and pattern characteristics of a user's grip on a stylus, consistent with embodiments of the present disclosure.

Figure 3A:
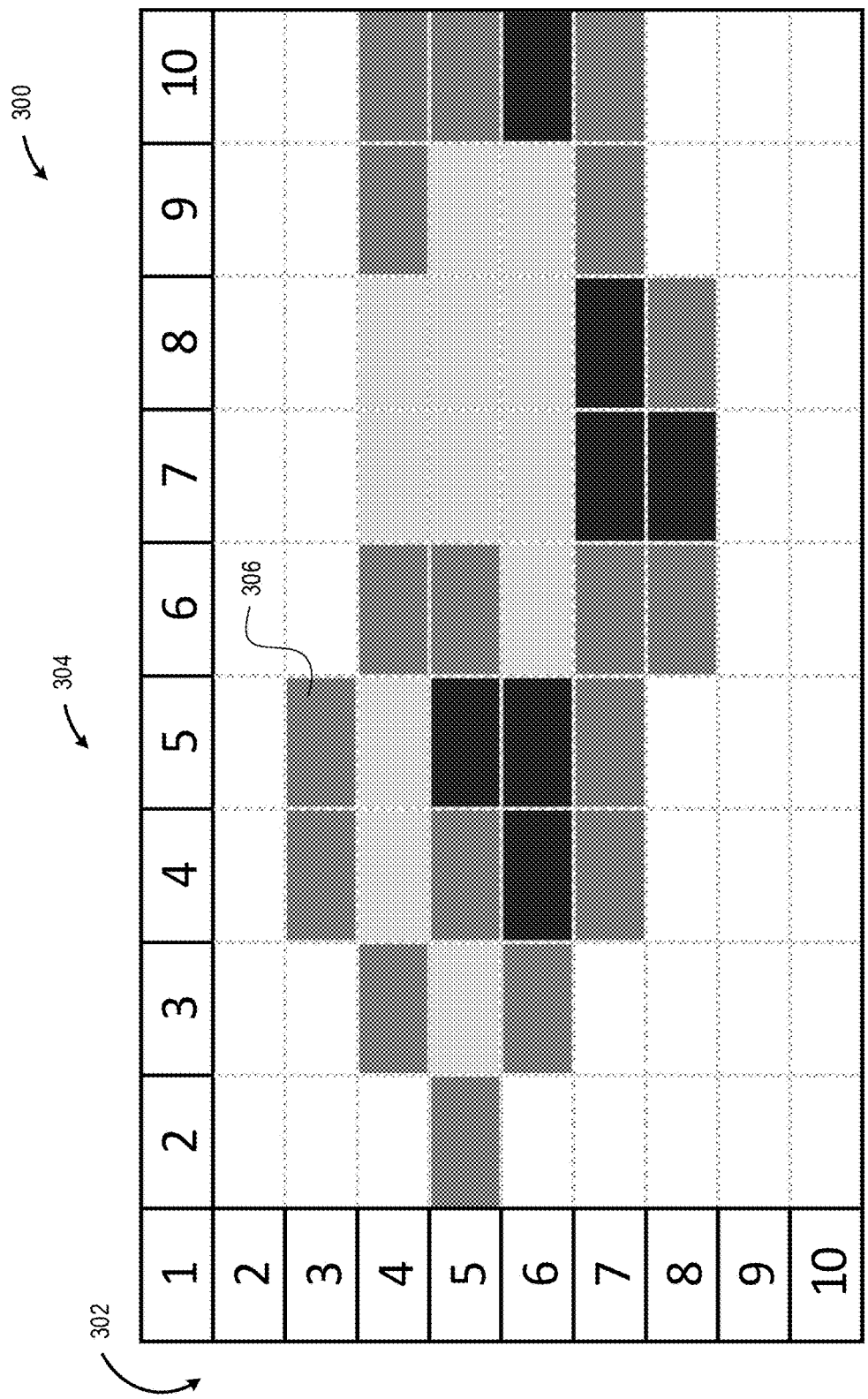
FIGS. 3A, 3B, 3C, and 3D are diagrams of signature maps of various grip characteristics on a stylus, consistent with embodiments of the present disclosure.

FIG. 3A is an example illustrative diagram of a signature map 300 that is representative of quantitative, qualitative, and pattern characteristics of a user having a pencil grip on a stylus, consistent with embodiments of the present disclosure. The signature map 300 includes a number of rows 302 and a number of columns 304 of individual units 306, according to an embodiment. As an example, the signature map 300 includes 10 rows and 10 columns, however, the signature map 300 may include a greater or fewer number of rows and/or columns. Each of the units 306 (100 units and the illustrated example) may be assigned a value that quantifies pressure applied to a corresponding portion of a grip sensor on a stylus. As shown by the key, as an example, each of the units 306 may have a value of 0, 1, 2, or 3 that corresponds with no pressure, light pressure, medium pressure, or firm pressure, according to an embodiment. In one implementation, no pressure may represent a user's finger hovering over a grip sensor, or the values may include hovering and not hovering categories in addition to or in lieu of one or more of other pressure or touch categories. The signature map 300 is color-coded for illustrative purposes and uses white to represent no pressure (e.g., hovering), light gray to represent light pressure, dark gray to represent medium pressure, and black to represent firm pressure, according to an embodiment. Although 4 values are used in the signature map 300, in practice, 2 values, 10 values, 100 values, or any range of values may be used to represent each of the units 306 of the signature map 300. Each of the units 306 may represent a pixel or location of an image sensor, a pressure sensor, a thermal sensor, a capacitive sensor, or some other type of grip sensor on the stylus.

The pattern of the signature map 300 (and its similar variants) may be mapped or correlated to a pencil stylus mode based on the quantity of each type of value for the units 306, based on the values of the units 306, and/or based on the pattern created by the values of the units 306.

Figure 3B:
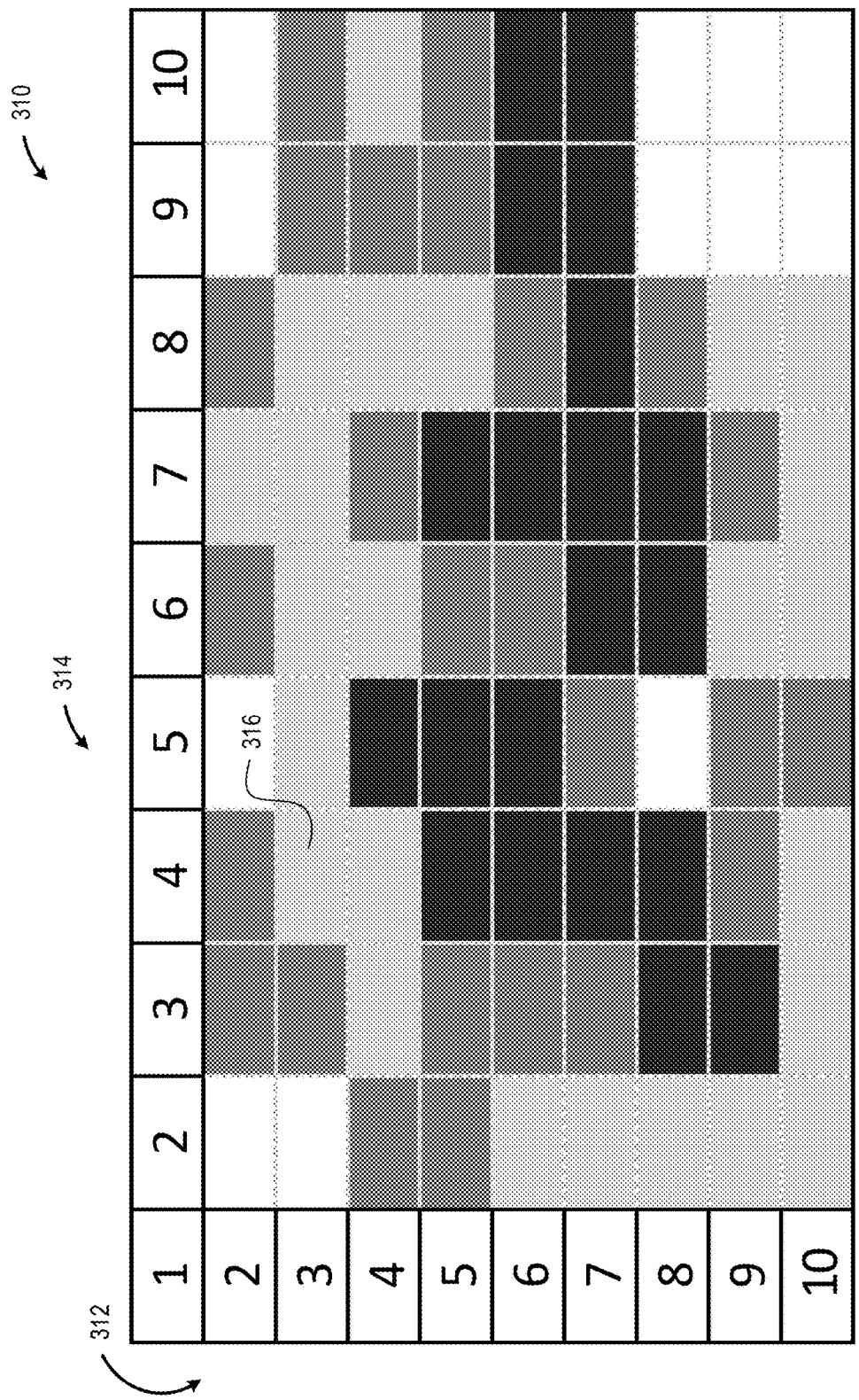

FIG. 3B is an example illustrative diagram of a signature map 310 that is representative of quantitative, qualitative, and pattern characteristics of a user having a paintbrush grip on a stylus, consistent with embodiments of the present disclosure. The signature map 310 includes a number of rows 312 and a number of columns 314 of individual units 316, according to an embodiment. As an example, the signature map 310 includes 10 rows and 10 columns, however, the signature map 310 may include a greater or fewer number of rows and/or columns. Each of the units 316 (100 units and the illustrated example) may be assigned a value that quantifies pressure applied to a corresponding portion of a grip sensor on a stylus. As shown by the key, as an example, each of the units 306 may have a value of 0, 1, 2, or 3 that corresponds with no pressure, light pressure, medium pressure, or firm pressure, according to an embodiment. The signature map 310 is color-coded for illustrative purposes and uses white to represent no pressure, light gray to represent light pressure, dark gray to represent medium pressure, and black to represent firm pressure, according to an embodiment. Although 4 values are used in the signature map 310, in practice, 2 values, 10 values, 100 values, or any range of values may be used to represent each of the units 316 of the signature map 310. Each of the units 316 may represent a pixel or location of an image sensor, a pressure sensor, a thermal sensor, a capacitive sensor, or some other type of grip sensor on the stylus.

The pattern of the signature map 310 (and its similar variants) may be mapped or correlated to a paintbrush stylus mode (e.g., using machine learning) based on the quantity of each type of value for the units 316, based on the values of the units 316, and/or based on the pattern created by the values of the units 316.

Figure 3C:
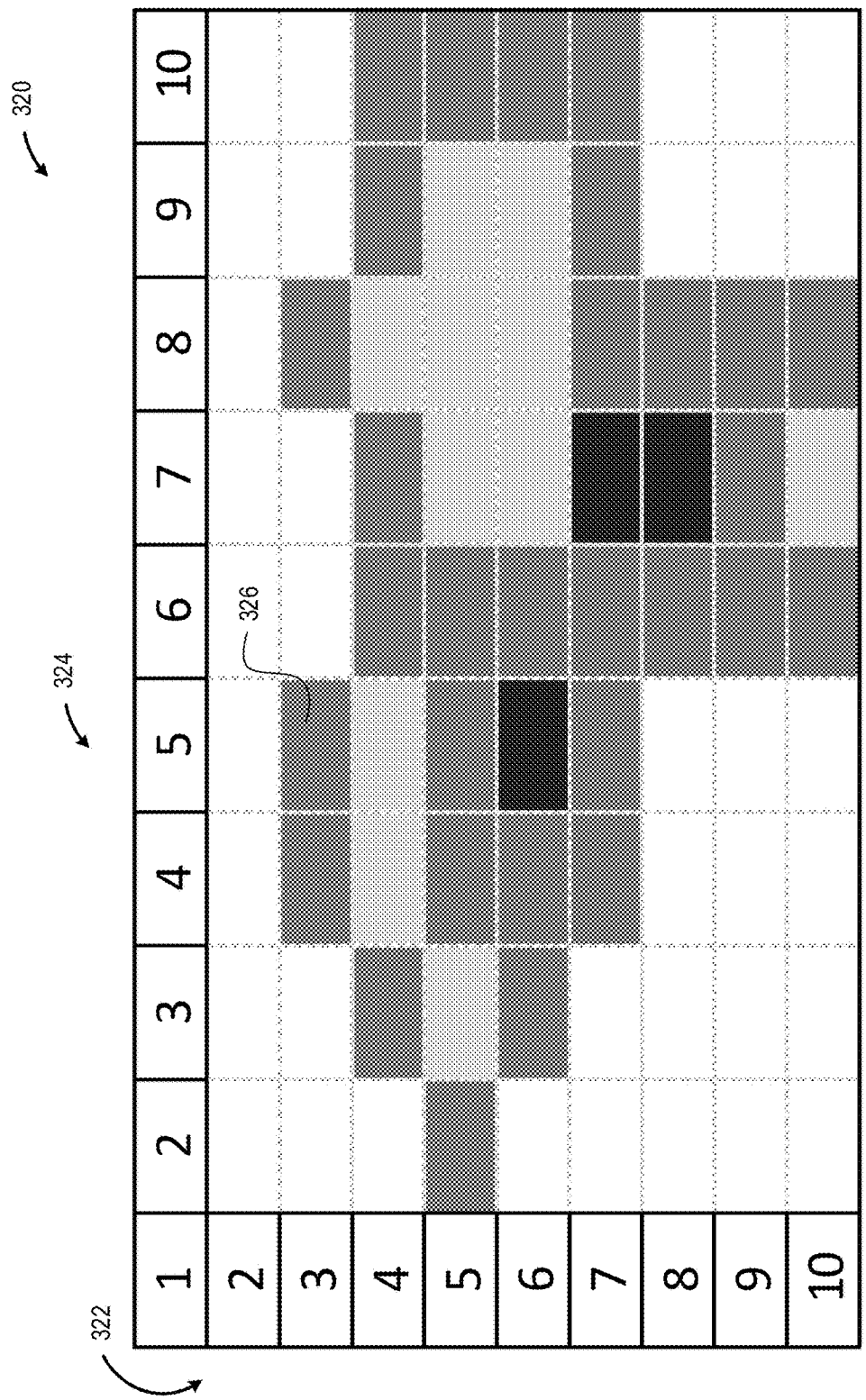

FIG. 3C is an example illustrative diagram of a signature map 320 that is representative of quantitative, qualitative, and pattern characteristics of a user having a selection tool grip on a stylus, consistent with embodiments of the present disclosure. The signature map 320 includes a number of rows 322 and a number of columns 324 of individual units 326, according to an embodiment. As an example, the signature map 320 includes 10 rows and 10 columns, however, the signature map 320 may include a greater or fewer number of rows and/or columns. Each of the units 326 (100 units and the illustrated example) may be assigned a value that quantifies pressure applied to a corresponding portion of a grip sensor on a stylus. As shown by the key, as an example, each of the units 306 may have a value of 0, 1, 2, or 3 that corresponds with no pressure, a light pressure, medium pressure, or firm pressure, according to an embodiment. The signature map 320 is color-coded for illustrative purposes and uses white to represent no pressure, light gray to represent light pressure, dark gray to represent medium pressure, and black to represent firm pressure, according to an embodiment. Although 4 values are used in the signature map 320, in practice, 2 values, 10 values, 100 values, or any range of values may be used to represent each of the units 326 of the signature map 320. Each of the units 326 may represent a pixel or location of an image sensor, a pressure sensor, a thermal sensor, a capacitive sensor, or some other type of grip sensor on the stylus.

The pattern of the signature map 320 (and its similar variants) may be mapped or correlated to a selection tool stylus mode (e.g., using machine learning) based on the quantity of each type of value for the units 326, based on the values of the units 326, and/or based on the pattern created by the values of the units 326.

Figure 3D:
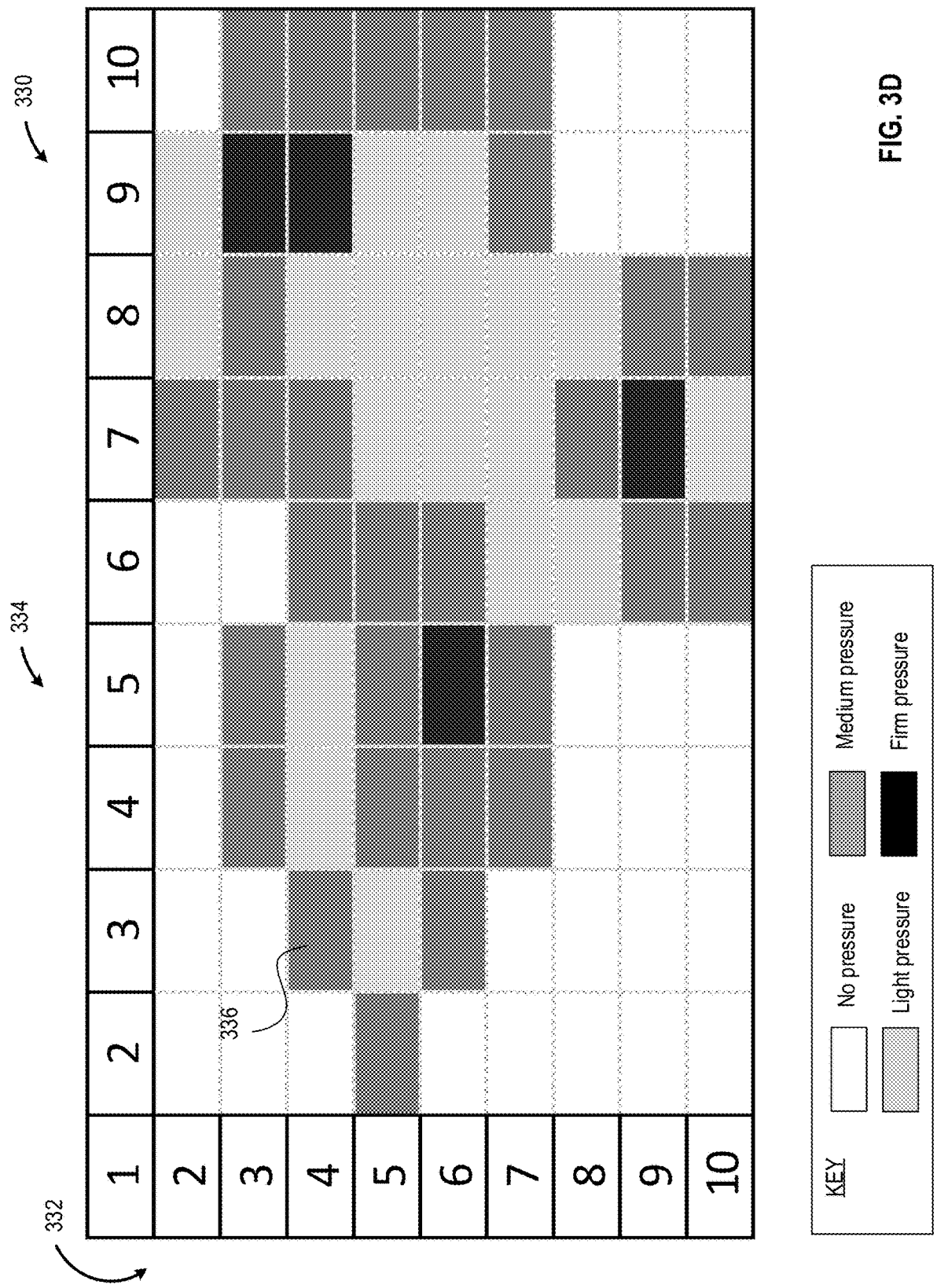

FIG. 3D is an example illustrative diagram of a signature map 330 that is representative of quantitative, qualitative, and pattern characteristics of a user having a pointer tool grip on a stylus, consistent with embodiments of the present disclosure. The signature map 330 includes a number of rows 332 and a number of columns 334 of individual units 336, according to an embodiment. As an example, the signature map 330 includes 10 rows and 10 columns, however, the signature map 330 may include a greater or fewer number of rows and/or columns. Each of the units 336 (100 units and the illustrated example) may be assigned a value that quantifies pressure applied to a corresponding portion of a grip sensor on a stylus. As shown by the key, as an example, each of the units 306 may have a value of 0, 1, 2, or 3 that corresponds with no pressure, a light pressure, medium pressure, or firm pressure, according to an embodiment. The signature map 330 is color-coded for illustrative purposes and uses white to represent no pressure, light gray to represent light pressure, dark gray to represent medium pressure, and black to represent firm pressure, according to an embodiment. Although 4 values are used in the signature map 330, in practice, 2 values, 10 values, 100 values, or any range of values may be used to represent each of the units 336 of the signature map 330. Each of the units 336 may represent a pixel or location of an image sensor, a pressure sensor, a thermal sensor, a capacitive sensor, or some other type of grip sensor on the stylus.

The pattern of the signature map 330 (and its similar variants) may be mapped or correlated to a pointer tool stylus mode (e.g., using machine learning) based on the quantity of each type of value for the units 336, based on the values of the units 336, and/or based on the pattern created by the values of the units 336.

Figure 4:
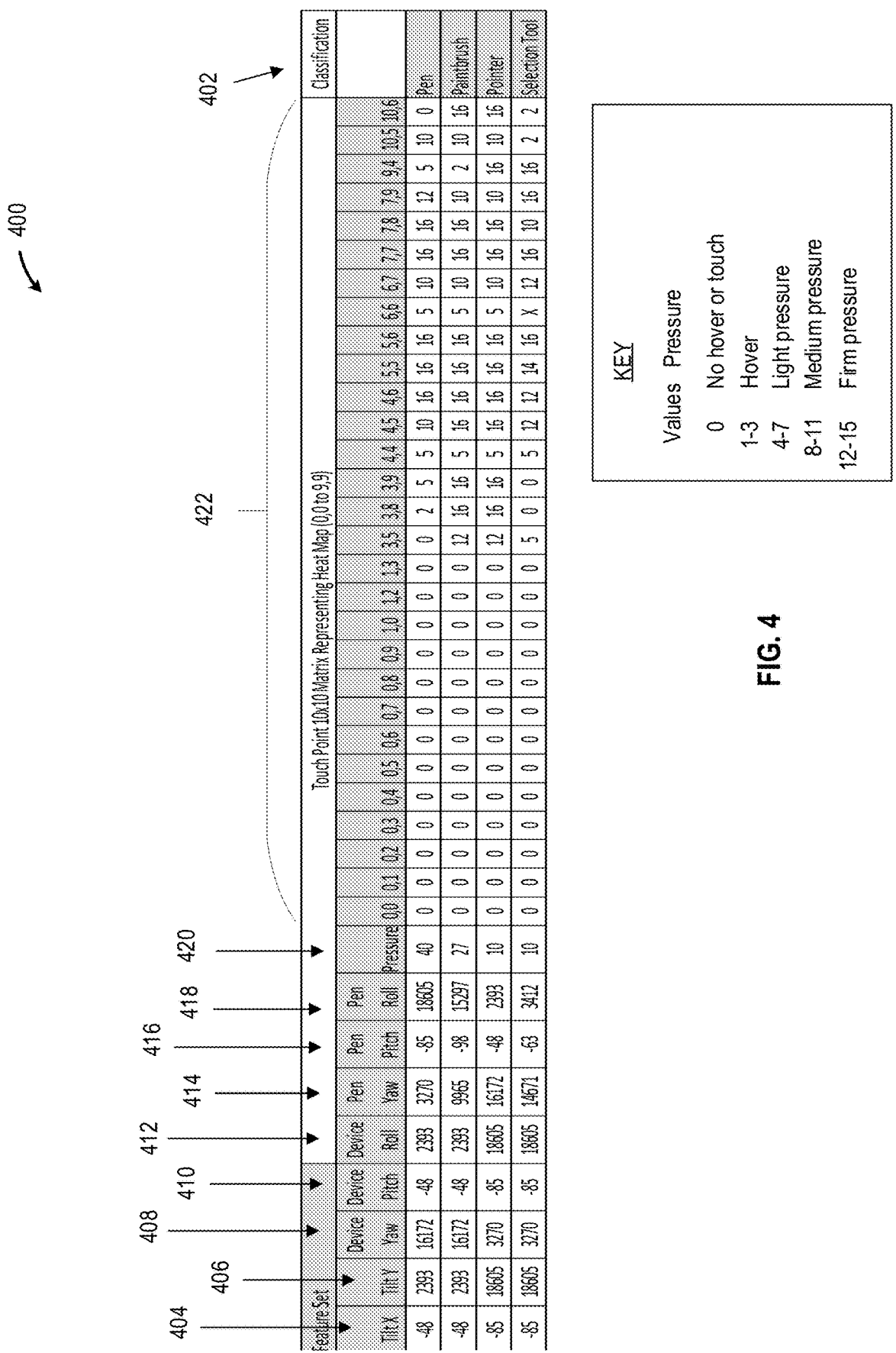
FIG. 4 is a table of example stylus characteristics and example computing system characteristics that may be associated, with machine learning, with a particular stylus mode, consistent with embodiments of the present disclosure.

FIG. 4 illustrates an example of a table 400 that includes stylus characteristics and computing system characteristics that may be associated, with machine learning, with a particular stylus mode (e.g., a classification category), consistent with embodiments of the present disclosure. The table 400 includes a number of columns that represent various characteristics of a user's interaction with a stylus and/or with a computing system. The table 400 includes a classification column 402 that represents a group of stylus modes from which a computing system may choose from based on characteristics of the stylus and/or of the computing system. The classifications can include, but are not limited to, pen, paintbrush, pointer, and selection tool.

The table 400 includes a number of columns associated with an orientation of the computing device and of the stylus. The table 400 includes a tilt x column 404 and a tilt y column 406 that represent accelerometer data (e.g., computing system orientation data) from a computing system. The table 400 may also include tilt x and tilt y data from an accelerometer within a stylus. The table 400 includes a yaw column 408, a pitch column 410, and a roll column 412 for a computing device, which values represent gyroscope data (e.g., computing system orientation data) for a computing system. The table 400 includes a yaw column 414, a pitch column 416, and a roll column 418 for a stylus, which values represent gyroscope data (e.g., stylus orientation data) for a stylus.

Table 400 includes a pressure column 420 that represents an average pressure detected by a grip sensor on a stylus, according to an embodiment.

The table 400 includes a number of columns representing locations and pressure values from a signature map (e.g., signature maps 300, 310, 320, 330, etc. of FIGS. 3A-3D) that is representative of locations of pressure applied to a grip sensor on a stylus, according to an embodiment. The pressure columns 422 may include values of 0 to represent no hover or touch, may include values of 1-3 to represent hover, may include values of 4-7 to represent light pressure, may include values of 8-11 to represent medium pressure, and may include values of 12-15 to represent firm pressure applied to the grip sensor. Touch sensor values of 0-15 may be used to represent a 4-bit value used to represent touch pressure. However, the values may be 0-16 or some other range that is not necessarily confined to a 4-bit value. Values collected from the system 100 (shown in FIG. 1) may be used to determine which stylus mode to select for a user, based on the stylus characteristics and/or based on the computing system orientation. The values may be represented by an 8-bit number (i.e., a range of 0-255), may be represented by a 16-bit number (i.e., a range of 0-65,535), or may have some other range, according to various embodiments. A larger range of values may provide a benefit of providing greater granularity to information collected by a grip sensor.

Figure 5:
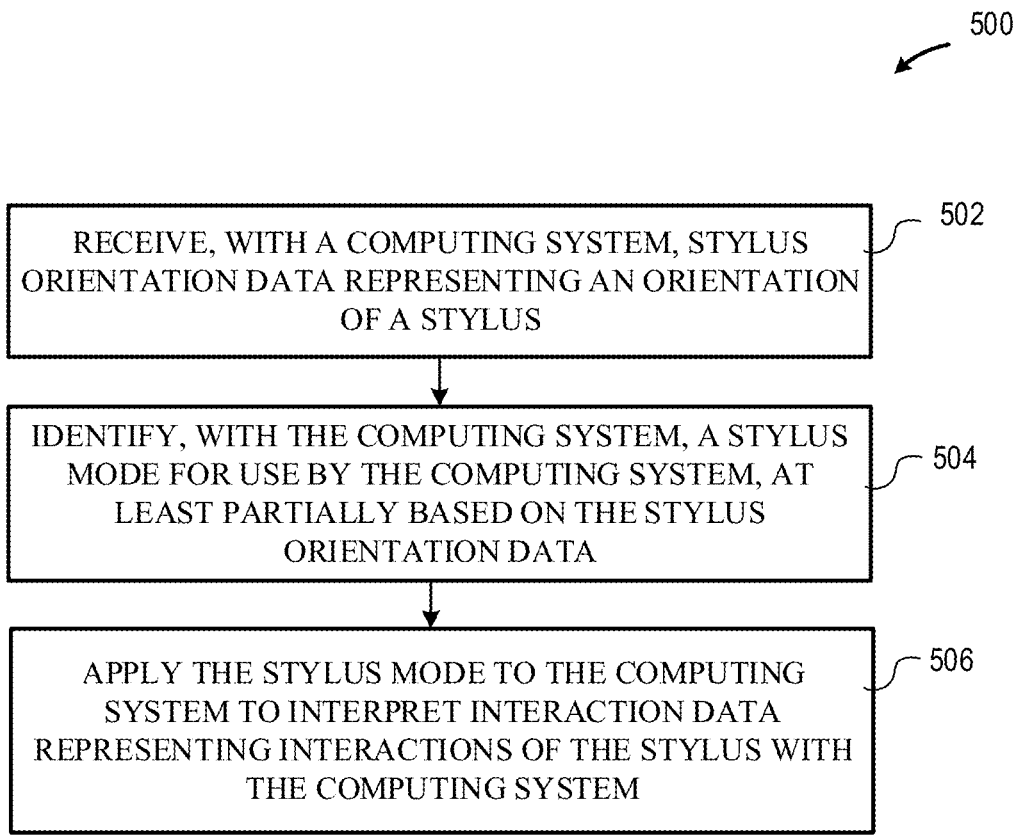
FIG. 5 is a flowchart of a process for determining a stylus mode of operation from stylus characteristics, consistent with embodiments of the present disclosure.

FIG. 5 illustrates a flow diagram of a process 500 for determining a stylus mode of operation from stylus characteristics, according to an embodiment.

At operation 502, the process 500 includes receiving, with a computing system, stylus orientation data representing an orientation of a stylus, according to an embodiment.

At operation 504, the process 500 includes identifying, with the computing system, a stylus mode for use by the computing system, at least partially based on the stylus orientation data, according to an embodiment.

At operation 506, the process 500 includes applying the stylus mode to the computing system to interpret interaction data representing interactions of the stylus with the computing system, according to an embodiment.

Figure 6:
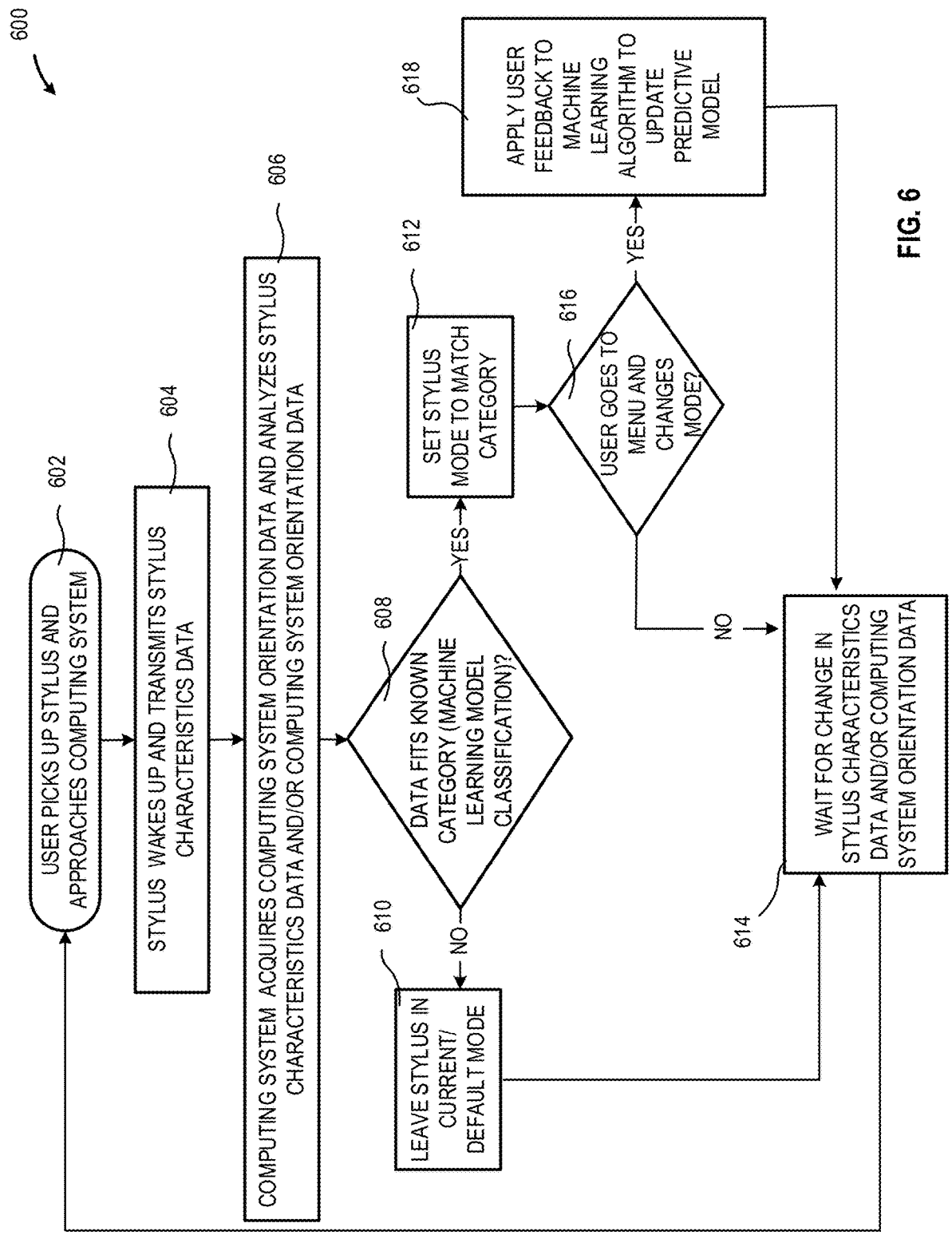
FIG. 6 is a flowchart of a process for determining a stylus mode of operation from stylus characteristics, consistent with embodiments of the present disclosure.

FIG. 6 illustrates a flow diagram of a process 600 for determining a stylus mode of operation from stylus characteristics, according to an embodiment.

At operation 602, a user picks up a stylus and approaches a computing system, according to an embodiment.

At operation 604, the stylus wakes up and transmits stylus characteristics data, according to an embodiment.

At operation 606, a computing system acquires computing system orientation data and analyzes stylus characteristics data and/or computing system orientation data, according to an embodiment. In an embodiment, analyzing stylus characteristics data and/or computing system orientation data may include applying stylus characteristics data and/or computing system orientation data to a predictive model. The predictive model outputs a category that represents a stylus mode selected from a group of stylus modes.

At operation 608, the process 600 determines whether data fits a known category (machine learning model classification), according to an embodiment. If data does not fit a known category, operation 608 proceeds to operation 610. If data does fit a known category, operation 608 proceeds to operation 612, according to an embodiment.

At operation 610, leave stylus in current/default mode, according to an embodiment. In other words, a computing system that executes the process 600 maintains a default or current stylus mode, rather than identifying a different user intent for the stylus. Operation 610 proceeds to operation 614, according to an embodiment.

At operation 614, the process 600 waits for a change in stylus characteristics data and/or computing system orientation data, according to an embodiment. In other words, at operation 614, the process 600 may wait for a stylus orientation to change, waits for a grip characteristic to change, or waits for a computing system orientation to change. Operation 614 proceeds to operation 602, according to an embodiment.

At operation 612, the process 600 sets a stylus mode to match the category, according to an embodiment.

At operation 616, the process 600 determines whether a user goes to a menu and changes the stylus mode, according to an embodiment. A user changing the stylus mode from the menu is one type of user feedback. A user changing the stylus mode from the menu may be interpreted as an indication that the process 600 has incorrectly selected a stylus mode for the user based on the stylus characteristics and/or the computing system orientation. The process 600 may be configured to interpret a user immediately changing the stylus mode as an incorrectly selected stylus mode, according to an embodiment. The process 600 may be configured to interpret a user changing the stylus mode with a predetermine time limit (e.g., under 30 seconds) as an incorrectly selected stylus mode, according to an embodiment. The process 600 may be configured to interpret a user changing the stylus mode as a first action during the user's interaction with a device (regardless of how much time has passed since the device is powered on) as an incorrectly selected stylus mode, according to an embodiment. If the user uses the pre-selected stylus mode for a while prior to changing the stylus mode from the menu, the process 600 may be configured to not interpret the user's change as an indication of an incorrectly selected stylus mode, according to an embodiment. If the user does not change the stylus mode, operation 616 proceeds to operation 614. If the user changes the stylus mode, operation 616 proceeds to operation 618, according to an embodiment.

At operation 618, the process 600 applies user feedback to a machine learning algorithm to update a predictive model, according to an embodiment. Updating the predictive model enables the process 600 to learn and evolve the automated stylus mode selection to stylus characteristics and to computing system orientation that is unique to or that is customized to use by a particular user.

Figure 7:
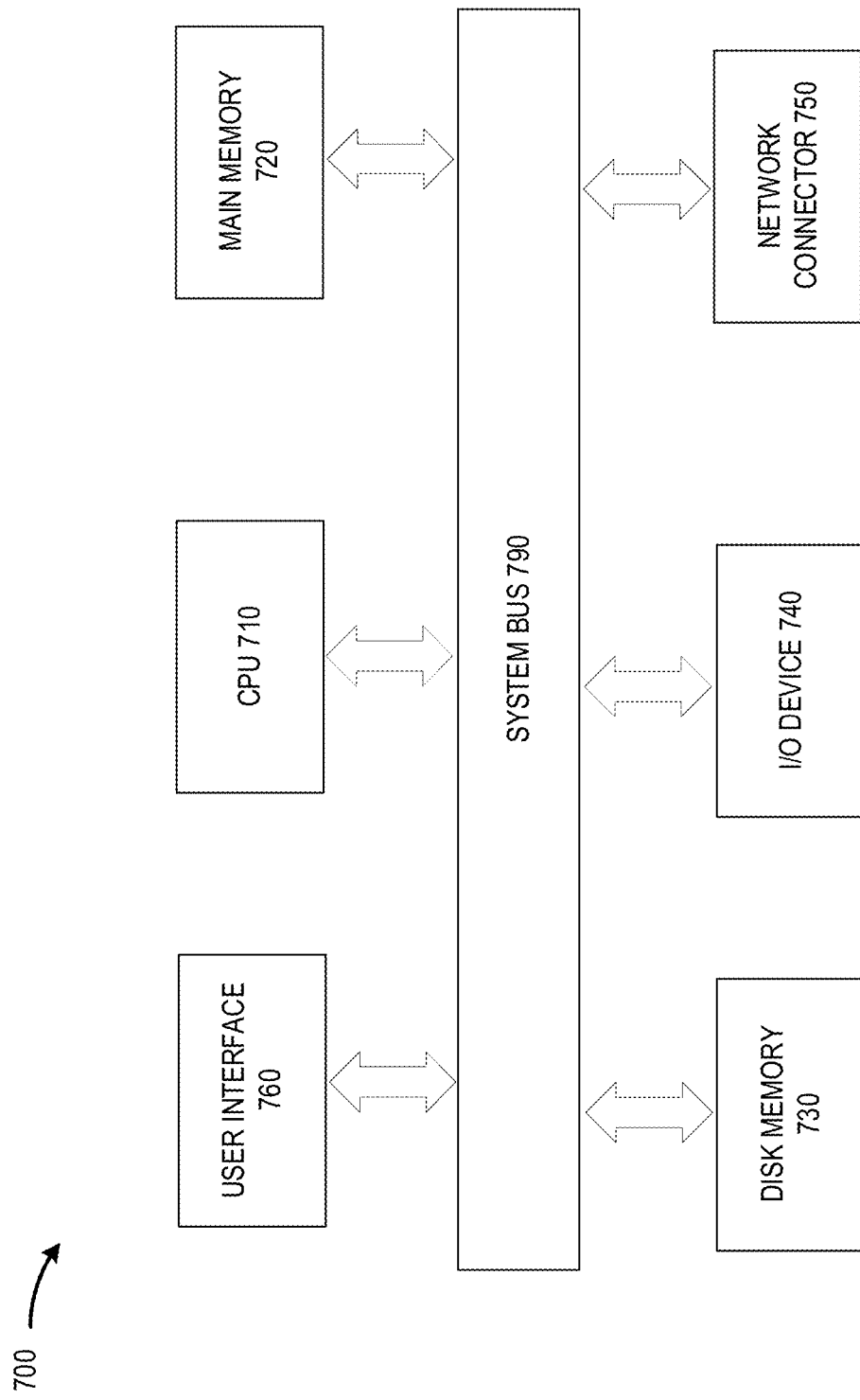
FIG. 7 is a block diagram illustrating a computing system, consistent with embodiments of the present disclosure.

FIG. 7 is an illustrative diagram 7 of a computing system 700 that may use one or more of the disclosed techniques for determining a stylus mode of operation from stylus characteristics, consistent with embodiments of the present disclosure. The computing system 700 may be included in, for example, a desktop computer, a laptop computer, a netbook, a notebook computer, a personal digital assistant (PDA), a server, a workstation, a cellular telephone, a mobile computing device, an Internet appliance or any other type of computing device.

The computing system 700 may include central processing unit (CPU) 710 to exchange data, via system bus 790, with user interface 760, main memory 720, disk memory 730, I/O device 740 and network connector 750.

The main memory 720 may include synchronous dynamic random-access memory (SDRAM), dynamic random access memory (DRAM), RAMBUS dynamic random access memory (RDRAM), and/or any other type of random access memory device. The main memory 720 may include non-volatile memory, such as solid state memory, phase change memory, 3D XPoint™, or any combination thereof.

The disk memory 730 may comprise, for example, a solid state disk (SSD) drive, flash memory, phase change memory (PCM), read-only memory (ROM), electrically erasable programmable read-only memory (EEPROM), or any other type of non-volatile memory device.

The network connector 750 may comprise, for example, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any other form of wireless communication protocol.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by a processor executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, a device, an apparatus, or a system related to predictive detection of user intent for stylus use, as discussed below.

Example 1

According to this example, there is provided a method of determining a stylus mode of operation from stylus characteristics. The method includes receiving, with a computing system, stylus orientation data representing an orientation of a stylus; identifying, with the computing system, a stylus mode for use by the computing system, at least partially based on the stylus orientation data; and applying the stylus mode to the computing system to interpret interaction data representing interactions of the stylus with the computing system.

Example 2

This example includes the elements of example 1, wherein the orientation of the stylus includes a roll angle, a pitch angle, and a yaw angle of the stylus.

Example 3

This example includes the elements of example 1, wherein the roll angle is rotation around an x axis, the pitch angle is rotation around a y axis, and a yaw angle is rotation around a z axis, wherein the x axis, the y axis, and the z axis represent axes of a Cartesian coordinate system.

Example 4

This example includes the elements of example 1, further comprising: receiving grip characteristics data representing characteristics of a grip of a user on the stylus.

Example 5

This example includes the elements of example 4, wherein the characteristics of the grip of the user on the stylus include one or more of quantitative characteristics, qualitative characteristics, or pattern characteristics.

Example 6

This example includes the elements of example 5, wherein the quantitative characteristics include a number of grip units touched by the user, wherein the qualitative characteristics include an amount of pressure applied to a grip sensor, wherein the pattern characteristics include a pattern of the grip of the user on the stylus.

Example 7

This example includes the elements of example 4, further comprising: identifying the stylus mode for use by the computing system at least partially based on the grip characteristics data.

Example 8

This example includes the elements of example 1, wherein the stylus mode is selected from a group of stylus modes, including one or more of: a writing mode; a painting mode; a drawing mode; a spray paint mode; a selection mode; or a pointer mode.

Example 9

This example includes the elements of example 1, wherein identifying the stylus mode includes applying the stylus orientation data to a predictive model to select the stylus mode from a plurality of stylus modes.

Example 10

This example includes the elements of example 1, further comprising: receiving corrective feedback data representing a selection of a corrected stylus mode by a user; and generating a replacement predictive model at least partially based on the corrective feedback data.

Example 11

This example includes the elements of example 1, further comprising: generating, with the computing system, computing system orientation data representing an orientation of the computing system; and identifying, with the computing system, a stylus mode for use by the computing system, at least partially based on the stylus orientation data and the computing system orientation data.

Example 12

According to this example, there is provided a computer readable device having instructions, which if executed by one or more processors, cause the one or more processors to perform a method of determining a stylus mode of operation from stylus characteristics. The instructions include receive, with a computing system, grip characteristics data representing characteristics of a grip of a user on a stylus; identify, with the computing system, a stylus mode for use by the computing system, at least partially based on the grip characteristics; and apply the stylus mode to the computing system to handle interaction data representing interactions of the stylus with the computing system.

Example 13

This example includes the elements of example 12, wherein the instructions further comprise: receive stylus orientation data representing an orientation of the stylus; and identify the stylus mode for use by the computing system at least partially based on the grip characteristics data and the stylus orientation data.

Example 14

This example includes the elements of example 12, wherein the characteristics of the grip of the user on the stylus include one or more of quantitative characteristics, qualitative characteristics, or pattern characteristics.

Example 15

This example includes the elements of example 14, wherein the quantitative characteristics include a number of grip units touched by the user, wherein the qualitative characteristics include an amount of pressure applied to a grip sensor, wherein the pattern characteristics include a pattern of the grip of the user on the stylus.

Example 16

This example includes the elements of example 12, wherein the stylus mode is selected from a group of stylus modes, including one or more of: a writing mode; a painting mode; a drawing mode; a spray paint mode; a selection mode; or a pointer mode.

Example 17

This example includes the elements of example 12, wherein identifying the stylus mode includes applying the grip characteristics data to a predictive model to select the stylus mode from a plurality of stylus modes.

Example 18

This example includes the elements of example 12, wherein the instructions further comprise: receiving corrective feedback data representing a selection of a corrected stylus mode by the user; and generating a replacement predictive model at least partially based on the corrective feedback data.

Example 19

This example includes the elements of example 12, wherein the instructions further comprise: generating, with the computing system, computing system orientation data representing an orientation of the computing system; and identifying, with the computing system, a stylus mode for use by the computing system, at least partially based on the grip characteristics data and the computing system orientation data.

Example 20

According to this example, there is provided a system. The system includes a stylus sensor to generate interaction data representing interactions of a stylus with a computing system; processor circuitry; and memory circuitry communicatively coupled to the processor circuitry, the memory circuitry to store instructions, which if executed by the processor circuitry, cause processor circuitry to perform a method of determining a stylus mode of operation from stylus characteristics. The instructions include receive, with a computing system, stylus orientation data representing an orientation of a stylus; identify, with the computing system, a stylus mode for use by the computing system, at least partially based on the stylus orientation data; and apply the stylus mode to the computing system to handle interaction data generated by the stylus sensor.

Example 21

This example includes the elements of example 20, wherein the orientation of the stylus includes a roll angle, a pitch angle, and a yaw angle of the stylus.

Example 22

This example includes the elements of example 20, wherein the instructions further include: receive grip characteristics data representing characteristics of a grip of a user on the stylus.

Example 23

This example includes the elements of example 22, wherein the instructions further include: identify the stylus mode for use by the computing system at least partially based on the grip characteristics data.

Example 24

This example includes the elements of example 20, wherein the stylus mode is selected from a group of stylus modes, including one or more of: a writing mode; a painting mode; a drawing mode; a spray paint mode; a selection mode; or a pointer mode.

Example 25

This example includes the elements of example 20, wherein instructions to identify the stylus mode include instructions to apply the stylus orientation data to a predictive model to select the stylus mode from a plurality of stylus modes.

Example 26

This example includes the elements of example 20, wherein the instructions further include: generate computing system orientation data representing an orientation of the computing system; and identify, with the computing system, a stylus mode for use by the computing system, at least partially based on the stylus orientation data and the computing system orientation data.

Example 27

According to this example, there is provided a computer readable device storing instructions that, if executed by one or more processors, performs the method of any one of examples 13 to 20.

Example 28

According to this example, there is provided a device comprising means to perform the method of any one of examples 1 to 11.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of determining a stylus mode of operation from stylus characteristics comprising:
receiving, with a computing system, stylus orientation data representing an orientation of a stylus;
receiving grip characteristics data representing characteristics of a grip of a user on the stylus;

identifying, with the computing system, a stylus mode for use by the computing system, at least partially based on the stylus orientation data and the grip characteristics data; and applying the stylus mode to the computing system to interpret interaction data representing interactions of the stylus with the computing system.

2. The method of claim 1, wherein the orientation of the stylus includes a roll angle, a pitch angle, and a yaw angle of the stylus.

3. The method of claim 2, wherein the roll angle is rotation around an x axis, the pitch angle is rotation around a y axis, and a yaw angle is rotation around a z axis, wherein the x axis, the y axis, and the z axis represent axes of a Cartesian coordinate system.

4. The method of claim 1, wherein the characteristics of the grip of the user on the stylus include one or more of quantitative characteristics, qualitative characteristics, or pattern characteristics.

5. The method of claim 4, wherein the quantitative characteristics include a number of grip units touched by the user, wherein the qualitative characteristics include an amount of pressure applied to a grip sensor, wherein the pattern characteristics include a pattern of the grip of the user on the stylus.

6. The method of claim 1, further comprising:
identifying the stylus mode for use by the computing system at least partially based on the grip characteristics data.

7. The method of claim 1, wherein the stylus mode is selected from a group of stylus modes, including one or more of:
a writing mode;
a painting mode;
a drawing mode;
a spray paint mode;
a selection mode; or
a pointer mode.

8. The method of claim 1, wherein identifying the stylus mode includes applying the stylus orientation data to a predictive model to select the stylus mode from a plurality of stylus modes.

9. The method of claim 1, further comprising:
receiving corrective feedback data representing a selection of a corrected stylus mode by a user; and
generating a replacement predictive model at least partially based on the corrective feedback data.

10. The method of claim 1, further comprising:
generating, with the computing system, computing system orientation data representing an orientation of the computing system; and
identifying, with the computing system, a stylus mode for use by the computing system, at least partially based on the stylus orientation data and the computing system orientation data.

11. A computer readable device having instructions, which if executed by one or more processors, cause the one or more processors to perform a method of determining a stylus mode of operation from stylus characteristics, the instructions comprising:
receive, with a computing system, grip characteristics data representing characteristics of a grip of a user on a stylus;
receive, with the computing system, stylus orientation data representing an orientation of a stylus;
identify, with the computing system, a stylus mode for use by the computing system, at least partially based on the grip characteristics data and the stylus orientation data; and
apply the stylus mode to the computing system to handle interaction data representing interactions of the stylus with the computing system.

12. The computer readable device of claim 11, wherein the characteristics of the grip of the user on the stylus include one or more of quantitative characteristics, qualitative characteristics, or pattern characteristics.

13. The computer readable device readable device of claim 12, wherein the quantitative characteristics include a number of grip units touched by the user, wherein the qualitative characteristics include an amount of pressure applied to a grip sensor, wherein the pattern characteristics include a pattern of the grip of the user on the stylus.

14. The computer readable device of claim 11, wherein the stylus mode is selected from a group of stylus modes, including one or more of:
a writing mode;
a painting mode;
a drawing mode;
a spray paint mode;
a selection mode; or
a pointer mode.

15. The computer readable device of claim 11, wherein identifying the stylus mode includes applying the grip characteristics data to a predictive model to select the stylus mode from a plurality of stylus modes.

16. The computer readable device of claim 11, wherein the instructions further comprise:
receiving corrective feedback data representing a selection of a corrected stylus mode by the user; and
generating a replacement predictive model at least partially based on the corrective feedback data.

17. The computer readable device of claim 11, wherein the instructions further comprise:
generating, with the computing system, computing system orientation data representing an orientation of the computing system; and
identifying, with the computing system, a stylus mode for use by the computing system, at least partially based on the grip characteristics data and the computing system orientation data.

18. A system comprising:
a stylus sensor to generate interaction data representing interactions of a stylus with a computing system;
processor circuitry; and
memory circuitry communicatively coupled to the processor circuitry, the memory circuitry to store instructions, which if executed by the processor circuitry, cause processor circuitry to perform a method of determining a stylus mode of operation from stylus characteristics, the instructions comprising:
receive, with a computing system, stylus orientation data representing an orientation of a stylus;
receive grip characteristics data representing characteristics of a grip of a user on the stylus;
identify, with the computing system, a stylus mode for use by the computing system, at least partially based on the stylus orientation data and the grip characteristics data; and
apply the stylus mode to the computing system to handle interaction data generated by the stylus sensor.

19. The system of claim 18, wherein the orientation of the stylus includes a roll angle, a pitch angle, and a yaw angle of the stylus.

20. The system of claim 18, wherein the stylus mode is selected from a group of stylus modes, including one or more of:
- a writing mode;
- a painting mode;
- a drawing mode;
- a spray paint mode;
- a selection mode; or
- a pointer mode.

21. The system of claim 18, wherein instructions to identify the stylus mode include instructions to apply the stylus orientation data to a predictive model to select the stylus mode from a plurality of stylus modes.

22. The system of claim 18, wherein the instructions further include:
- generate computing system orientation data representing an orientation of the computing system; and
- identify, with the computing system, a stylus mode for use by the computing system, at least partially based on the stylus orientation data and the computing system orientation data.

* * * * *